US012585133B2

(12) United States Patent (10) Patent No.: US 12,585,133 B2
Maeda (45) Date of Patent: Mar. 24, 2026

(54) LIGHT SOURCE APPARATUS INCLUDING SPLITTER AND IMAGE DISPLAY APPARATUS INCLUDING THE SAME

(71) Applicant: CANON KABUSHIKI KAISHA, Tokyo (JP)

(72) Inventor: Yuuki Maeda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/782,054

(22) Filed: Jul. 24, 2024

(65) Prior Publication Data

US 2025/0044496 A1 Feb. 6, 2025

(30) Foreign Application Priority Data

Aug. 3, 2023 (JP) ................................. 2023-126896

(51) Int. Cl.
| | |
|---|---|
| *G02B 27/10* | (2006.01) |
| *F21V 8/00* | (2006.01) |
| *G02F 1/1335* | (2006.01) |
| *G03B 21/20* | (2006.01) |

(52) U.S. Cl.
CPC ........... *G02B 27/10* (2013.01); *G02B 6/0031* (2013.01); *G02B 6/0055* (2013.01); *G02B 6/0068* (2013.01); *G02B 27/1006* (2013.01); *G02F 1/133524* (2013.01); *G02F 1/133553* (2013.01); *G02F 1/133557* (2021.01); *G03B 21/2033* (2013.01)

(58) Field of Classification Search
CPC ................ G02B 27/10; G02B 27/1006; G02F 1/133524; G02F 1/133553; G02F 1/133557; G03B 21/2003
See application file for complete search history.

(56) References Cited

U.S. PATENT DOCUMENTS

| | | | |
|---|---|---|---|
| 10,725,368 B2 | 7/2020 | Maeda | |
| 10,845,581 B2 | 11/2020 | Maeda | |
| 10,866,498 B2 | 12/2020 | Maeda | |
| 2015/0316781 A1 | 11/2015 | Maeda | |
| 2017/0199317 A1* | 7/2017 | Lee ...................... | G02B 6/0035 |
| 2020/0292840 A1 | 9/2020 | Popovich | |
| 2020/0348461 A1* | 11/2020 | Meng .................... | G02B 6/005 |

(Continued)

OTHER PUBLICATIONS

Di Zhang, Mengxin Ren, Wei Wu, Ninghui Gao, Xuanyi Yu, Wei Cai, Xinzheng Zhang, and Jingjun Xu, "Nanoscale beam splitters based on gradient metasurfaces," Opt. Lett. 43, 267-270, 2018 (Year: 2018).*

(Continued)

*Primary Examiner* — Keith G. Delahoussaye

(74) *Attorney, Agent, or Firm* — Carter, DeLuca & Farrell LLP

(57) ABSTRACT

The light source apparatus includes a light source, and a light guide plate configured to propagate a light beam from the light source in a specific direction. The light guide plate includes a splitter configured to split the light beam from the light source into a plurality of light beams, and to emit the plurality of light beams from the light guide plate. The splitter is configured such that a transmittance for a predetermined wavelength included in the light beam from the light source increases along the specific direction. A predetermined inequality is satisfied.

13 Claims, 6 Drawing Sheets

(56) References Cited

U.S. PATENT DOCUMENTS

| 2021/0223633 A1 * | 7/2021 | Meng ................ G02F 1/133524 |
| 2021/0318481 A1 * | 10/2021 | Häussler .............. G02B 6/0028 |
| 2023/0236489 A1 | 7/2023 | Maeda |

OTHER PUBLICATIONS

A Guide to Beamsplitters, Wavelength Blog, Omega Optical|Optometrics, Web Page, May 8, 2022, Accessed Mar. 15, 2025 (Year: 2022).*

* cited by examiner

LIGHT SOURCE APPARATUS INCLUDING SPLITTER AND IMAGE DISPLAY APPARATUS INCLUDING THE SAME

BACKGROUND

Technical Field

One of the aspects of the embodiments relates to a light source apparatus configured to uniformly illuminate an image display element or the like with a light beam from a light source, and an image display apparatus having the light source apparatus.

Description of Related Art

A configuration has conventionally been disclosed that propagates a light beam from a light source through total reflection within a light guide plate using a diffraction element, splits the light beam into a plurality of light beams, and illuminates an image display element (see US Patent Application Publication No. 2020/0292840).

However, a diffraction angle of the diffraction element changes depending on a wavelength, and thus a plurality of light guide plates are required to uniformly illuminate the image display element with light beams of a plurality of wavelengths. In addition, the diffraction element has low mass productivity because its performance significantly changes due to minute structural changes.

SUMMARY

The light source apparatus includes a light source, and a light guide plate configured to propagate a light beam from the light source in a specific direction. The light guide plate includes a splitter configured to split the light beam from the light source into a plurality of light beams, and to emit the plurality of light beams from the light guide plate. The splitter is configured such that a transmittance for a predetermined wavelength included in the light beam from the light source increases along the specific direction. The following inequality is satisfied:

$$2.0 \leq n/m$$

where n is the number of areas of the splitter with different transmittances, and m is the number of light beams.

Further features of various embodiments of the disclosure will become apparent from the following description of embodiments with reference to the attached drawings.

DESCRIPTION OF THE EMBODIMENTS

Figures 1, 2:
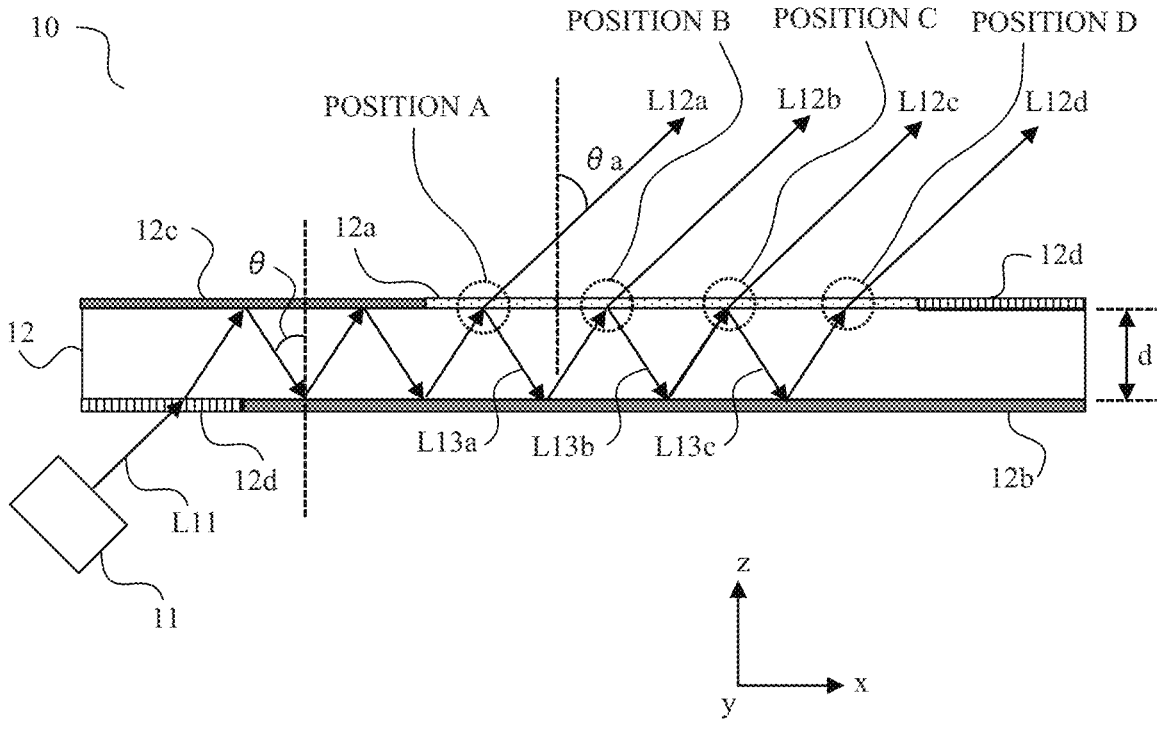
FIG. 1 is a configuration diagram of a light source apparatus according to Example 1.
FIG. 2 is a configuration diagram of a light source according to Example 1.

Referring now to the accompanying drawings, a detailed description will be given of embodiments according to the disclosure. Corresponding elements in respective figures will be designated by the same reference numerals, and a duplicate description thereof will be omitted.

EXAMPLE 1

FIG. 1 is a configuration diagram of a light source apparatus 10 according to this example. The light source apparatus 10 includes a light source 11, and a light guide plate 12, and is applicable to an image display apparatus.

The light source 11 emits collimated light obtained by collimating light from a laser light source with a collimator lens. The light source 11 may emit collimated light that is a combination of laser light of two or more colors. The light source 11 may emit collimated light obtained by collimating light from a light source such as an LED and a mercury lamp. This example assumes collimated light that is a combination of laser beams having wavelengths of 450 nm, 520 nm, and 635 nm.

Since the light from the laser light source is emitted with a predetermined angular distribution, collimated light generally has an illuminance distribution in which the illuminance is high at the center and low at the periphery. For improved illuminance uniformity of the illumination light, the collimated light emitted from the light source 11 may have a uniform illuminance distribution.

FIG. 2 is a configuration diagram of the light source 11. The light source 11 includes a laser light source 21, a first deflection element 22, and a second deflection element 23. The first deflection element 22 converts the emitted light with a predetermined angular distribution from the laser light source 21 into deflected emitted light with a uniform angular distribution, and the second deflection element 23 collimates the deflected emitted light. The deflection element is an optical element such as a metasurface, a diffraction element, or an aspherical collimator lens, and may have a configuration in which the first deflection element 22 and the second deflection element 23 are provided on both sides of a single element. Since collimated light generally has a circular or elliptical distribution, the illuminance distribution of the collimated light may be shaped with a rectangular distribution using a deflection element.

The light guide plate 12 includes a first dielectric film (splitter, separator, or divider) 12a, a second dielectric film (reflector) 12b, a third dielectric film 12c, and a fourth dielectric film 12d.

The first dielectric film 12a has a characteristic of reflecting part of the light beam from the light source 11 and transmitting the other part. Thereby, the first dielectric film 12a has a characteristic of splitting (separating or dividing) a light beam from the light source 11 (light with a predetermined wavelength in the light guide plate 12) into a plurality of light beams, and of emitting the plurality of light beams from the light guide plate 12. The first dielectric film 12a is configured such that the transmittance for a predetermined wavelength included in a light beam from the light source 11 increases along the +x direction (specific direction), which is a direction in which the light beam from the light source 11 propagates within the light guide plate 12. The predetermined wavelength is the center wavelength or the wavelength at which the intensity of the light beam from the light source 11 is the strongest.

In this example, the first dielectric film 12a is a dielectric gradient film configured such that the transmittance increases along the +x direction. For example, the first dielectric film 12a is configured such that transmittance Tx(x1) at first position x1 of the first dielectric film 12a is 25%, and transmittance Tx(x2) at second position x2 different from the first position x1 in the +x direction is 75%. Transmittance Tx(x3) at third position x3 (=(x2+x1)/2) as a middle of the first position x1 and the second position x2 in the +x direction may satisfy the following inequality (1).

$$30 \le Tx(x3) \le 70 \qquad (1)$$

The following inequality (2a) or (2b) may be satisfied:

$$U(x1) < U(x3) < U(x2) \qquad (2a)$$
$$U(x2) < U(x3) < U(x1) \qquad (2b)$$

where U(x1), U(x2), and U(x3) are film thicknesses of the first dielectric film 12a at the first position x1, the second position x2, and the third position x3, respectively.

The thickness of the first dielectric film 12a may continuously increase or decrease along the +x direction. In a case where the film thickness is a gradient film in which the film thickness continuously changes, the dielectric film can be deposited in a single deposition process, and the film can be manufactured easily.

Figures 3A, 3B:
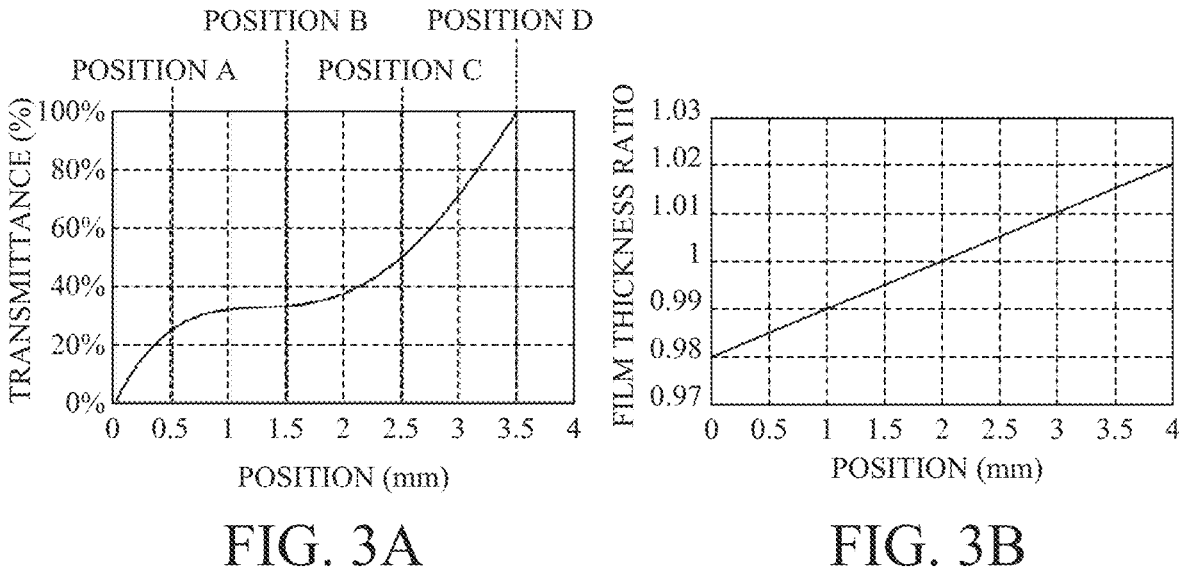
FIGS. 3A and 3B illustrate the transmittance and film thickness ratio of a first dielectric film according to Example 1 for light of a predetermined wavelength.

FIGS. 3A and 3B respectively illustrate the transmittance and film thickness ratio of the first dielectric film 12a for light with a predetermined wavelength. In this example, the predetermined wavelength is 520 nm. The wavelengths of 450 nm and 635 nm have similar characteristics. In FIG. 3B, the film thickness at the center is normalized to 1. The first dielectric film 12a may include minute areas such that the transmittance changes stepwise.

In this example, the light guide plate 12 has a refractive index n of 1.52, an incident angle θ of light in the light guide plate 12 is 21.6°, and an exit angle θa of light emitted from the light guide plate 12 is 34.0°. A diffraction element, a hologram element, a metasurface, or the like may be used instead of the first dielectric film 12a.

The second dielectric film 12b is provided to face the first dielectric film 12a, and has a characteristic of reflecting incident light near a predetermined angle. In this example, the second dielectric film 12b has a characteristic of reflecting light having an incident angle of 21.6° and transmitting light having an incident angle of 0°. The third dielectric film 12c has a characteristic of reflecting at least light having an incident angle of 21.6°. The second dielectric film 12b may be used as the third dielectric film 12c. The fourth dielectric film 12d is an antireflection film.

A light beam L11 from the light source 11 enters the light guide plate 12, propagates in the +x direction via the second dielectric film 12b and the third dielectric film 12c, enters the first dielectric film 12a, and is split into a light beam L12a (about 25% of L11) and a light beam L13a (about 75% of L11). The light beam L13a is reflected by the second dielectric film 12b, enters the first dielectric film 12a, and is split into a light beam L12b (approximately 25% of L11) and a light beam L13b (approximately 50% of L11). The light beam L13b is reflected by the second dielectric film 12b, enters the first dielectric film 12a, and is split into a light beam L12c (approximately 25% of L11) and a light beam L13c (approximately 25% of L11). The light beam L13c is reflected by the second dielectric film 12b, enters the first dielectric film 12a, and is emitted as a light beam L12d (approximately 25% of L11). The light beam emitted from the light guide plate 12 is used as a light beam for illuminating an unillustrated image display element or the like.

Figure 4:
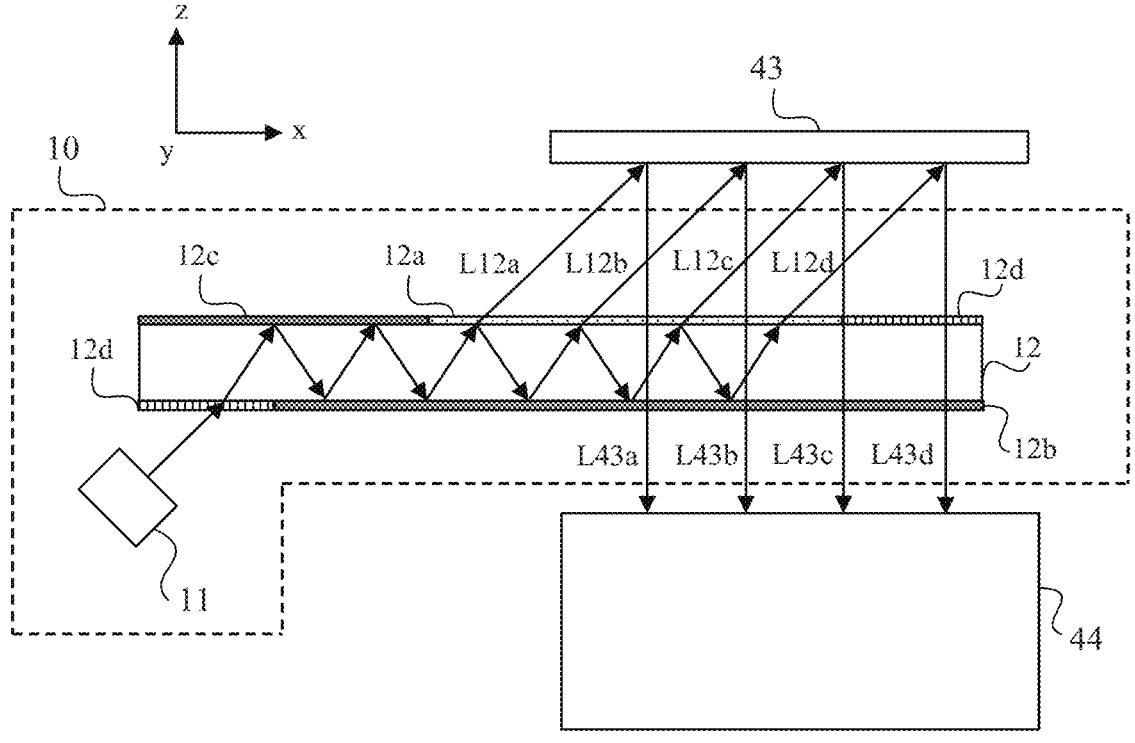
FIG. 4 is a configuration diagram of an image display apparatus according to Example 1.

FIG. 4 is a configuration diagram of the image display apparatus according to this example. The image display apparatus includes a light source apparatus 10, a digital mirror device 43, and a projection lens 44.

The digital mirror device 43 is an image display element whose pixels are include minute mirrors and which generates an image by temporally tilting each minute mirror. In this example, the micromirror has a deflection angle of 17°, and the digital mirror device 43 emits light incident at an incident angle of 34° as ON light at an incident angle of 0°. The light beam emitted from the light guide plate 12 illuminates the digital mirror device 43 at an incident angle of 34.0°. The ON light reflected by the digital mirror device 43 is emitted as light beams L43 (L43a, L43b, L43c, L43d), which transmit through the first dielectric film 12a and the second dielectric film 12b at incident angles of 0°, illuminate an illuminated surface via the projection lens 44.

A description will now be given of an example configuration according to this example.

A diffusion plate may be disposed between the digital mirror device 43 and the light guide plate 12 or between the projection lens 44 and the light guide plate 12 to diffuse the light beam L43. Thereby, high resolution performance can be obtained in accordance with an F-number of the projection lens 44.

The following inequality (3) may be satisfied:

$$2.0 \le n/m \qquad (3)$$

where n is the number of areas of the first dielectric film 12a with different transmittances, and m is the number of splits (separations or divisions) of the light beam (the number of light beams generated by splitting the light beam from the light source 11 by the first dielectric film 12a).

In this example, the number of areas n is ∞, and the number of splits m is 4. In a case where the value becomes lower than the lower limit of inequality (3), a transmittance step increases, and if an incident light beam position near the area boundary slightly shifts from a designed value, the transmittance significantly changes, so the uniformity of light beams illuminating the illuminated surface significantly deteriorates.

Inequality (3) may be replaced with inequality (3a) below:

$$4.0 \le n/m \qquad (3a)$$

Inequality (3) may be replaced with inequality (3b) below:

$$10.0 \leq n/m \tag{3b}$$

The following inequality (4) may be satisfied:

$$u/(d \times \sin\theta) \leq 0.50 \tag{4}$$

where d (mm) is a thickness of the light guide plate 12 (a distance between the reflector and the splitter), u (mm) is a width of the smallest area among the areas with different characteristics of the first dielectric film 12$a$ in the xz section (although the width u is extremely close to 0 in this example), and θ is an incident angle of a principal ray that enters the first dielectric film 12$a$.

In a case where the value becomes higher than the upper limit of inequality (4), a transmittance step increases, and if an incident light beam position near the area boundary slightly shifts from a designed value, the transmittance significantly changes, so the uniformity of the light beams illuminating the illuminated surface significantly deteriorates.

Inequality (4) may be replaced with inequality (4a) below:

$$u/(d \times \sin\theta) \leq 0.25 \tag{4a}$$

Inequality (4) may be replaced with inequality (4b) below:

$$u/(d \times \sin\theta) \leq 0.10 \tag{4b}$$

The following inequality (5) may be satisfied:

$$0 \leq T(\theta) \leq 20 \tag{5}$$

where T(θ) (%) is a transmittance of the second dielectric film 12$b$ for light incident at an angle θ (°).

In a case where the value becomes higher than the upper limit of inequality (5), the light utilization efficiency of the light beam propagating through the light guide plate 12 decreases.

Inequality (5) may be replaced with inequality (5a) below:

$$0 \leq T(\theta) \leq 15 \tag{5a}$$

Inequality (5) may be replaced with inequality (5b) below:

$$0 \leq T(\theta) \leq 10 \tag{5b}$$

The following inequality (6) may be satisfied:

$$80 \leq T(0) \leq 100 \tag{6}$$

where T(0) (%) is a transmittance of the second dielectric film 12$b$ for light incident at an angle of 0°.

In a case where the value becomes lower than the lower limit of inequality (6), the ON light amount reflected by the digital mirror device 43 and guided to the projection lens 44 decreases, and the light utilization efficiency lowers.

Inequality (6) may be replaced with inequality (6a) below:

$$90 \leq T(0) \leq 100 \tag{6a}$$

Inequality (6) may be replaced with inequality (6b) below:

$$95 \leq T(0) \leq 100 \tag{6b}$$

The following inequality (7) may be satisfied:

$$10 \leq \theta1 \leq \mathrm{Arcsin}(1/n) \tag{7}$$

where n is a refractive index within the light guide plate 12, and θ1 (°) is an incident angle of light incident on the first dielectric film 12$a$.

In a case where the value becomes lower than the lower limit of inequality (7), it becomes difficult to design a dielectric film that satisfies inequalities (3) and (4). In a case where the value becomes higher than the upper limit of inequality (7), the incident angle of light entering the first dielectric film 12$a$ becomes larger than the critical angle, the light beam within the light guide plate 12 is totally reflected by the light guide plate 12, and the split light beam cannot be extracted.

Inequality (7) may be replaced with inequality (7a) below:

$$15 \leq \theta1 \leq \mathrm{Arcsin}(1/n) \tag{7a}$$

Inequality (7) may be replaced with inequality (7b) below:

$$15 \leq \theta1 \leq 40 \tag{7b}$$

The following inequality (8) may be satisfied in order to design a dielectric film that satisfies inequalities (3) and (4):

$$0.00 < W/R < 0.03 \tag{8}$$

where R (nm) is a center wavelength of at least one spectrum of the light beam from the light source 11, and W (nm) is a half maximum full-width of the spectrum.

In this example, the center wavelengths R are 450 nm, 520 nm, and 635 nm, which are the main wavelengths of the laser light source. In a case where the value becomes higher than the upper limit of inequality (8), it becomes difficult to design a dielectric film that controls transmission and reflection in a wide wavelength range depending on the angle, as illustrated in inequalities (3) and (4), and the light utilization efficiency lowers.

Inequality (8) may be replaced with inequality (8a) below:

$$0.00 < W/R < 0.02 \tag{8a}$$

Inequality (8) may be replaced with inequality (8b) below:

$$0.00 < W/R < 0.15 \tag{8b}$$

In order to reduce the thickness of the light guide plate 12, an angle of a light beam propagating in the +x direction is to increase. According to the Snell's law, the smaller the refractive index is relative to the angle θa, the larger the incident angle on the first dielectric film 12*a* is. Thus, the following inequality (9) may be satisfied:

$$1.00 \leq n \leq 1.80 \tag{9}$$

where n is a refractive index of the light guide plate 12.

Inequality (9) may be replaced with inequality (9a) below:

$$1.00 \leq n \leq 1.70 \tag{9a}$$

Inequality (9) may be replaced with inequality (9b) below:

$$1.00 \leq n \leq 1.60 \tag{9b}$$

EXAMPLE 2

Figure 5:
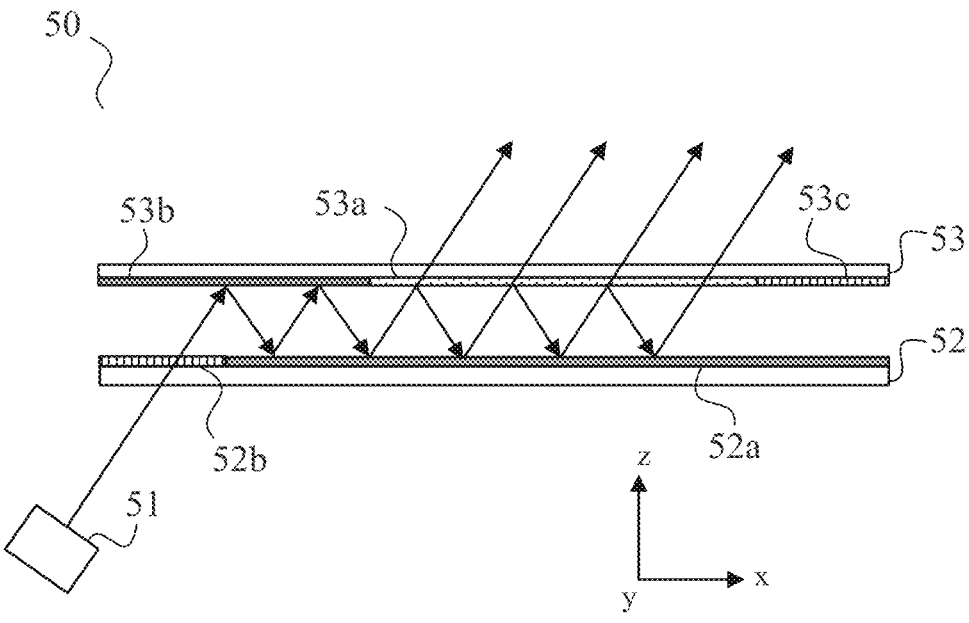
FIG. 5 is a configuration diagram of a light source apparatus according to Example 2.

FIG. 5 is a configuration diagram of a light source apparatus 50 according to this example. The light source apparatus 50 includes a light source 51, a first optical member 52, and a second optical member 53. The first optical member 52 and the second optical member 53 constitute a light guide plate.

The first optical member 52 is a reflector, and includes a first dielectric film 52*a* having the same optical effect as that of the second dielectric film 12*b* according to Example 1, and a second dielectric film 52*b* that is an antireflection film. The second optical member 53 includes a third dielectric film 53*a* that is a splitter, a fourth dielectric film 53*b* that is a reflective film, and a fifth dielectric film 53*c* that is an antireflection film.

A light beam from the light source 51 enters a light guide plate including the first optical member 52 and the second optical member 53, is split according to the same principle as that of Example 1, and exits from the light guide plate. In this example, the incident angle θ of light on the light guide plate is 34.0°, and the exit angle θa of light emitted from the light guide plate is 34.0°.

EXAMPLE 3

Figure 6:
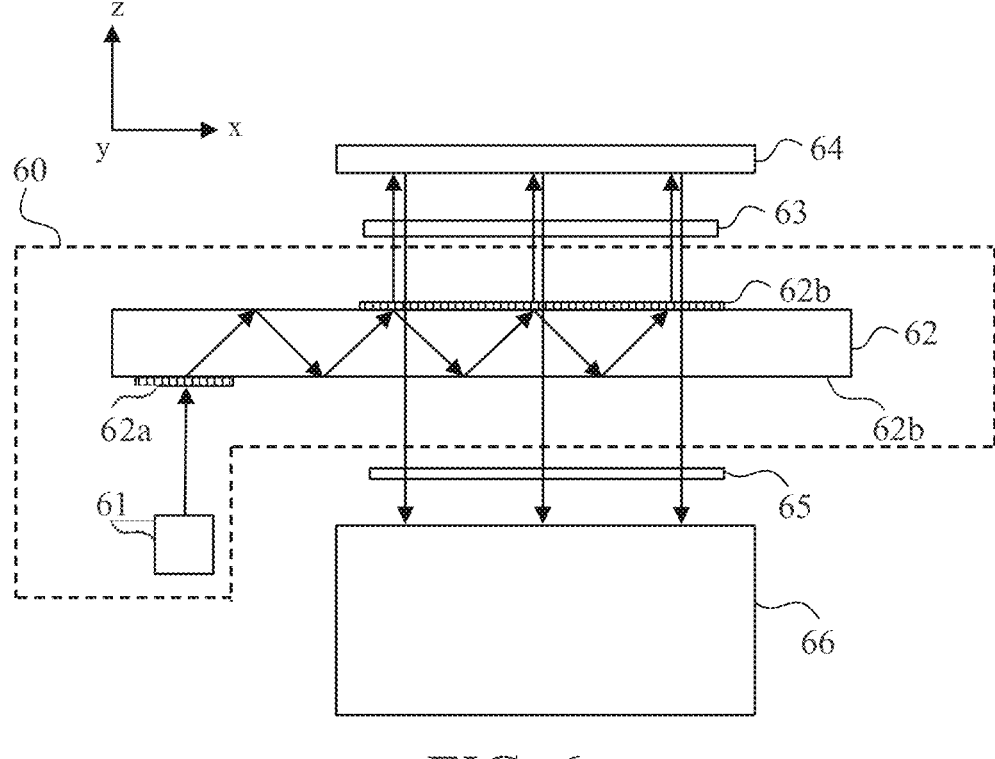
FIG. 6 is a configuration diagram of an image display apparatus according to Example 3.

FIG. 6 is a configuration diagram of an image display apparatus according to this example. The image display apparatus includes a light source apparatus 60 including a light source 61 and a light guide plate 62, a phase plate (waveplate) 63, a reflection type liquid crystal panel 64 as an image display element, a polarizing plate 65, and a projection lens 66.

The light guide plate 62 includes a first diffraction element 62*a*, and a second diffraction element 62*b*. The second diffraction element 62*b* has a characteristic that the transmittance continuously increases along the +x direction, and is different from the dielectric film according to Example 1 in that the transmitting light is deflected by diffraction. A predetermined polarized light beam from the light source 61 is deflected by the first diffraction element 62*a*, propagates in the +x direction within the light guide plate 62 by total reflection, is deflected and split into a plurality of light beams by the second diffraction element 62*b*, and is emitted. The light beam emitted from the light guide plate 62 illuminates the reflection type liquid crystal panel 64 via the phase plate 63. Light (ON light) whose polarization is modulated by the reflection type liquid crystal panel 64 transmits through the polarizing plate 65, and light whose polarization is not modulated (OFF light) is absorbed by the polarizing plate 65.

The second diffraction element 62*b* may include minute areas and have a characteristic of increasing the transmittance stepwise along the +x direction. In this example, the incident angle θ of the light in the light guide plate 62 is 50.0°, and the exit angle θa of the light emitted from the light guide plate 62 is 0.0°. A hologram element, a metasurface, or the like may be used instead of the diffraction element.

EXAMPLE 4

Figure 7:
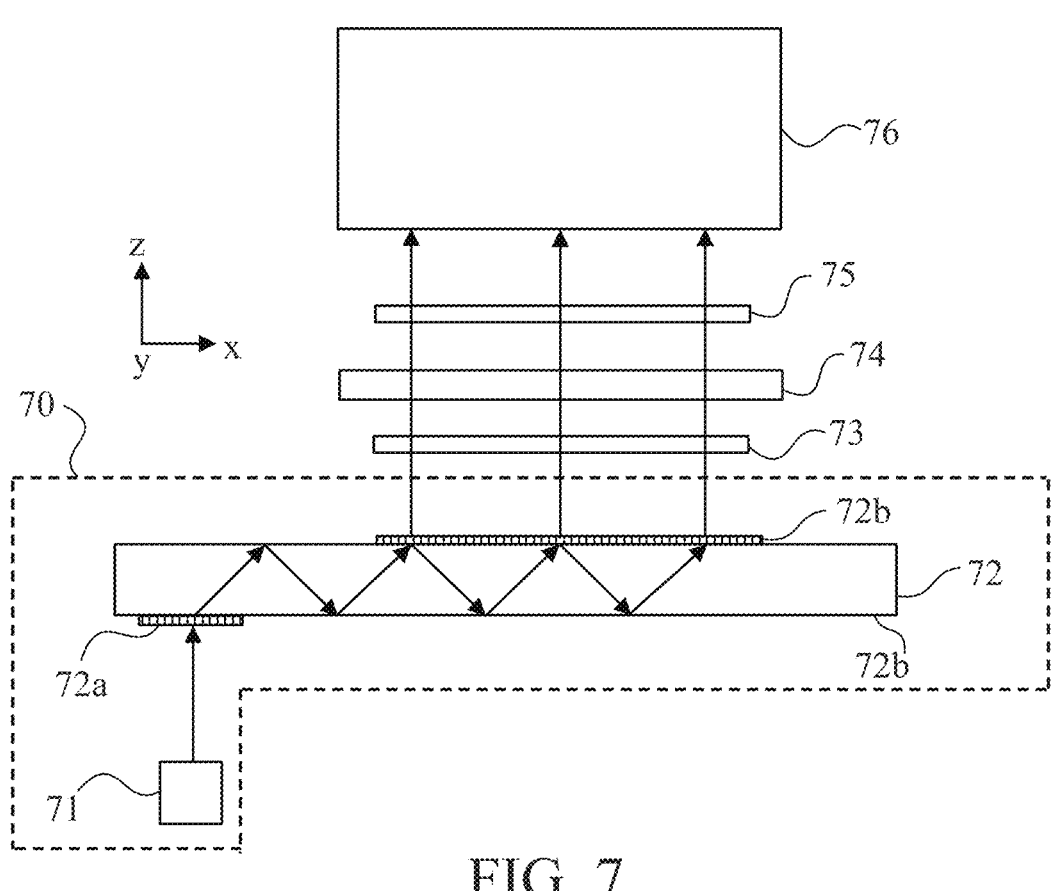
FIG. 7 is a configuration diagram of an image display apparatus according to Example 4.

FIG. 7 is a configuration diagram of the image display apparatus according to this example. The image display apparatus includes a light source apparatus 70 including a light source 71 and a light guide plate 72, a first polarizing plate 73, a transmission type liquid crystal panel 74 as an image display element, a second polarizing plate 75, and a projection lens 76. The light guide plate 72 includes a first diffraction element 72*a* and a second diffraction element 72*b*. A predetermined polarized light beam from the light source 71 is deflected by the first diffraction element 72*a*, propagated in the +x direction through total reflection within the light guide plate 72, is deflected and split into a plurality of light beams by the second diffraction element 72*b*, and is emitted. The light beam emitted from the light guide plate 72 illuminates the transmission type liquid crystal panel 74 via the first polarizing plate 73. The light (ON light) whose polarization is modulated by the transmission type liquid crystal panel 74 transmits through the second polarizing plate 75, and the unmodulated light (OFF light) is absorbed by the second polarizing plate 75.

EXAMPLE 5

Figure 8:
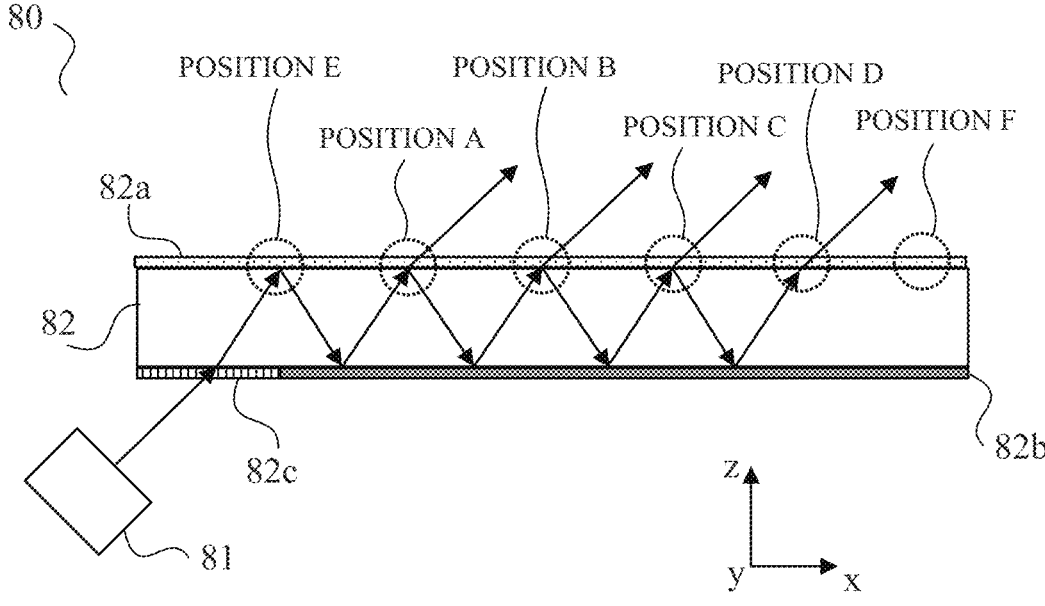
FIG. 8 is a configuration diagram of a light source apparatus according to Example 5.

FIG. 8 is a configuration diagram of a light source apparatus 80 according to this example. The light source apparatus 80 includes a light source 81 and a light guide plate 82. The light guide plate 82 includes a first dielectric film 82*a* that is a splitter, a second dielectric film 82*b* that is a reflector, and a third dielectric film 82*c* that is an antireflection film.

Figures 9A, 9B:
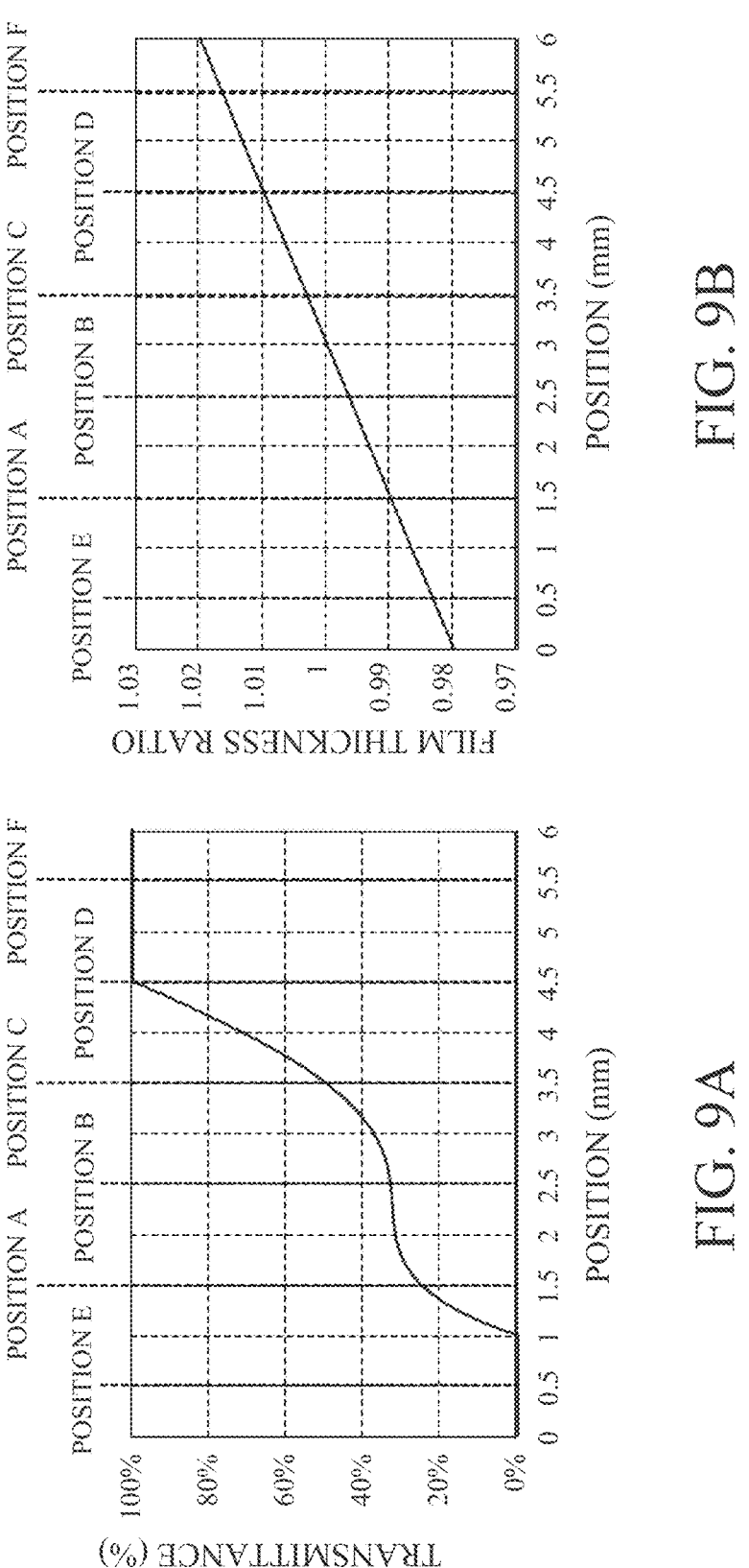
FIGS. 9A and 9B illustrate the transmittance and film thickness ratio of a first dielectric film according to Example 5 for light of a predetermined wavelength.
Figure 10:
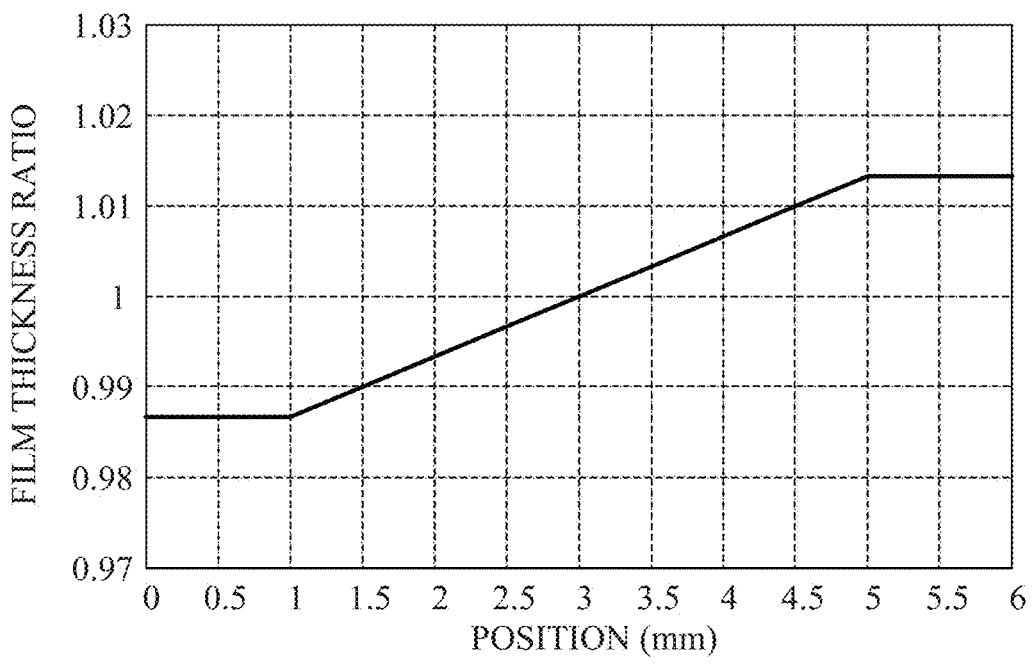
FIG. 10 illustrates another example of the film thickness ratio of the first dielectric film according to Example 5.

FIGS. 9A and 9B respectively illustrate the transmittance and film thickness ratio of the first dielectric film 82*a* for light of a predetermined wavelength. In FIG. 9B, the film thickness at the center is normalized to 1. The first dielectric film 82*a* is a gradient film having a characteristic in which the reflectance is approximately 100% at position E and the transmittance is approximately 100% at position F. The first dielectric film 82*a* is configured such that the thickness increases along the +x direction, but the thickness can decrease along the +x direction. Further, the first dielectric film 82*a* may be configured to have a film thickness illustrated in FIG. 10.

EXAMPLE 6

Figure 11:
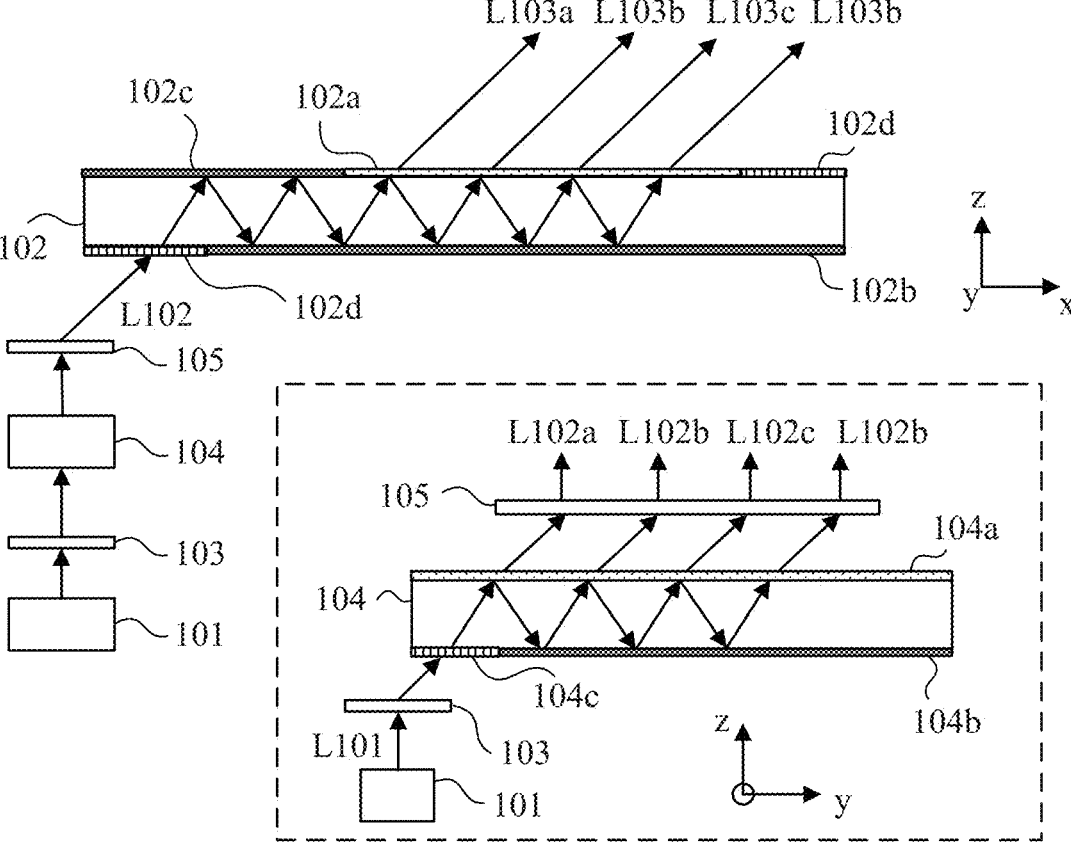
FIG. 11 is a configuration diagram of a light source apparatus according to Example 6.

FIG. 11 is a configuration diagram of a light source apparatus according to this example. The light source apparatus includes a light source 101, a first light guide plate 102, a first deflector 103, a second light guide plate 104, and a second deflector 105.

The first light guide plate 102 includes a first dielectric film 102*a* as a splitter, a second dielectric film 102*b* as a reflector, a third dielectric film 102*c* as a reflection film, and a fourth dielectric film 102*d* as an antireflection film. The second light guide plate 104 includes a fifth dielectric film 104*a* as a splitter, a sixth dielectric film 104*b* as a reflector, and a seventh dielectric film 104*c* as an antireflection film. A light beam L101 from the light source 101 is deflected by the first deflector 103 and enters the second light guide plate 104. The light beam L101 incident on the second light guide plate 104 is split by the second light guide plate 104, deflected by the second deflector 105, and emitted as light beams L102 (L102*a*, L102*b*, L102*c*, L102*d*). The light beams L102 enter the first light guide plate 102, are emitted as a light beams L103, and are used as light beams for illuminating an unillustrated image display element or the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a light source apparatus that has a reduced size and can uniformly illuminate an image display element with high efficiency.

This application claims priority to Japanese Patent Application No. 2023-126896, which was filed on Aug. 3, 2023, and which is hereby incorporated by reference herein in its entirety.

What is claimed is:

1. A light source apparatus comprising:
a light source; and
a light guide plate configured to propagate a light beam from the light source in a specific direction,
wherein the light guide plate includes a splitter configured to split the light beam from the light source into a plurality of light beams, and to emit the plurality of light beams from the light guide plate,
wherein the splitter is configured such that a transmittance for a predetermined wavelength included in the light beam from the light source increases along the specific direction, wherein the light guide plate is provided to face the splitter and includes a reflector configured to reflect the light beam from the light source, and
wherein the following inequality is satisfied:

$$2.0 \le n/m$$

$$0 \le T(\theta) \le 20$$

where n is the number of areas of the splitter with different transmittances, m is the number of light beams, and $T(\theta)$ is a transmittance of the reflector for the light beam from the light source that enters the reflector at an incident angle $\theta$ (°).

2. The light source apparatus according to claim 1, wherein the transmittance increases continuously or stepwise along the specific direction.

3. The light source apparatus according to claim 1, wherein the predetermined wavelength is a center wavelength or a wavelength having a highest intensity of the light beam from the light source.

4. The light source apparatus according to claim 1, wherein the following inequality is satisfied:

$$u/(d \times \sin \theta) \le 0.50$$

where d is a thickness of the light guide plate, u is a width of a smallest area of the splitter among the areas with different transmittances, and $\theta$ is an incident angle of a principal ray incident on the splitter.

5. The light source apparatus according to claim 1, wherein the light guide plate is provided to face the splitter and includes a reflector configured to reflect the light beam from the light source, and
wherein the following inequality is satisfied:

$$80 \le T(0) \le 100$$

where T(0) is a transmittance of the reflector for the light beam from the light source that enters the reflector at an incident angle of 0 (°).

6. The light source apparatus according to claim 1, wherein the following inequality is satisfied:

$$0.00 < W/R < 0.03$$

where R is a center wavelength of at least one spectrum of the light beam from the light source, and W is a half maximum full-width of the spectrum.

7. The light source apparatus according to claim 1, wherein the splitter is a dielectric film configured such that the transmittance increases along the specific direction, and
wherein a thickness of the dielectric film changes along the specific direction.

8. The light source apparatus according to claim 7, wherein the splitter includes a dielectric gradient film that has a transmittance of 25% at a first position and a transmittance of 75% at a second position different from the first position in the specific direction.

9. The light source apparatus according to claim 8, wherein the following inequality is satisfied:

$$30 \leq Tx \leq 70$$

where Tx is a transmittance of the splitter at a third position as a middle of the first position and the second position in the specific direction.

10. The light source apparatus according to claim 7, wherein the following inequality is satisfied:

$$U(x1) < U(x3) < U(x2) \text{ or } U(x2) < U(x3) < U(x1)$$

where U(x1) is a thickness of the dielectric gradient film at a first position, U(x2) is a film thickness at a second position different from the first position in the specific direction, and U(x3) is a film thickness at a third position as a middle of the first position and the second position in the specific direction.

11. The light source apparatus according to claim 1, wherein the light guide plate is provided to face the splitter and includes a reflector configured to reflect the light beam from the light source, and wherein the splitter reflects a part of the light beam from the light source and transmits another part of the light beam.

12. An image display apparatus comprising:
the light source apparatus according to claim 1; and
an image display element illuminated by the light source apparatus.

13. A light source apparatus comprising:
a light source; and
a light guide plate configured to propagate a light beam from the light source in a specific direction,
wherein the light guide plate includes a splitter configured to split the light beam from the light source into a plurality of light beams, and to emit the plurality of light beams from the light guide plate,
wherein the splitter is configured such that a transmittance for a predetermined wavelength included in the light beam from the light source increases along the specific direction,
wherein the light guide plate is provided to face the splitter and includes a reflector configured to reflect the light beam from the light source,
wherein the splitter reflects a part of the light beam from the light source and transmits another part of the light beam, and
wherein the following inequality is satisfied:

$$2.0 \leq n/m$$

where n is the number of areas of the splitter with different transmittances, and m is the number of light beams.

* * * * *